US007421628B2

(12) United States Patent
Wright et al.

(10) Patent No.: US 7,421,628 B2
(45) Date of Patent: Sep. 2, 2008

(54) METHODS AND APPARATUS TO EXTRACT CODES FROM A PLURALITY OF CHANNELS

(75) Inventors: David H. Wright, Clearwater, FL (US); Daniel Nelson, Tampa, FL (US); Ronald G. Schwerer, Belleair Beach, FL (US)

(73) Assignee: Nielsen Media Research, Inc., New York, NY (US)

( * ) Notice: Subject to any disclaimer, the term of this patent is extended or adjusted under 35 U.S.C. 154(b) by 269 days.

(21) Appl. No.: 11/278,917

(22) Filed: Apr. 6, 2006

(65) Prior Publication Data

US 2007/0011558 A1 Jan. 11, 2007

Related U.S. Application Data

(63) Continuation of application No. PCT/US03/31697, filed on Oct. 7, 2003.

(51) Int. Cl.
*H04J 3/24* (2006.01)
*H04H 9/00* (2006.01)

(52) U.S. Cl. ..................................... 714/704; 455/2.01

(58) Field of Classification Search ................. 714/709; 455/2.01

See application file for complete search history.

(56) References Cited

U.S. PATENT DOCUMENTS 3,720,791 A * 3/1973 Yada et al. .................. 370/301
3,739,278 A * 6/1973 Gautney et al. ............ 340/7.49
3,760,388 A * 9/1973 Schmitz et al. ............... 360/40
4,392,233 A * 7/1983 Laughner .................... 375/339
4,694,490 A * 9/1987 Harvey et al. ............... 380/234
5,241,689 A * 8/1993 Schwed et al. .............. 455/517
5,745,845 A 4/1998 Suenaga et al.
5,790,500 A 8/1998 Itokawa et al.
5,907,827 A * 5/1999 Fang et al. .................. 704/503
6,023,490 A 2/2000 Ten Kate
6,338,037 B1 1/2002 Todd et al.
6,463,410 B1 10/2002 Fuchigami et al.
6,588,015 B1 7/2003 Eyer et al.
6,804,510 B1 10/2004 Bates et al.
7,180,434 B2 * 2/2007 Ozawa et al. ................. 341/60
7,343,615 B2 * 3/2008 Nelson et al. ................. 725/19
2003/0131350 A1 * 7/2003 Peiffer et al. .................. 725/18
2005/0054285 A1 * 3/2005 Mears et al. ............... 455/2.01

OTHER PUBLICATIONS

Submitted herewith is a Written Opinion of the International Searching Authority for the International application No. PCT/US03/31697.

(Continued)

*Primary Examiner*—Stephen M. Baker
(74) *Attorney, Agent, or Firm*—Hanley, Fligh & Zimmerman, LLC

(57) ABSTRACT

Methods and apparatus to extract audio codes are disclosed. An example method includes receiving signals on a plurality of channels and ranking the signals based on at least one characteristic of the signals. A first channel from the plurality of channels is selected based upon the ranking of the signals. The example method further include determining whether a first signal on the first channel includes at least one code and extracting the at least one code from the first signal when the first signal includes the at least one code.

22 Claims, 4 Drawing Sheets

OTHER PUBLICATIONS

International Search Report for International application No. PCT/US03/31697 published with publication No. WO 2005/046286 A1, May 19, 2005.

International Preliminary Examing Authority, International Preliminary Examination Report for PCT/US03/31697, Dec. 30, 2005, 6 pages.

* cited by examiner

METHODS AND APPARATUS TO EXTRACT CODES FROM A PLURALITY OF CHANNELS

RELATED APPLICATION

This application is a continuation of PCT patent application serial no. PCT/US03/31697 filed Oct. 7, 2003.

TECHNICAL FIELD

The present disclosure relates to decoding systems and, more particularly, to methods and apparatus to extract codes from a plurality of channels.

BACKGROUND

It is known to add or embed codes in broadcast audio and/or video and/or vertical blanking interval signals. For example, codes may be embedded in television and/or radio broadcasts and/or in pre-recorded audio or video content. In the field of audience metering, codes can be added to audio and/or video signals for the purpose of, for example, identifying programs and/or the distributor(s) that are broadcasting the programs, identifying commercials and promotional announcements, and the like.

Codes that are added to audio signals can be reproduced in the audio signal output by a speaker. Accordingly, these arrangements offer the possibility of non-intrusively intercepting and decoding the codes with equipment that uses microphonic inputs. For example, these systems enable measuring broadcast audiences by the use of portable metering equipment carried by panelists.

Audio codes are inserted at low intensities to prevent the codes from distracting a listener of program audio and, therefore, such codes can be vulnerable to various signal processing operations. Consequently, these approaches to encoding a broadcast audio signal may not be compatible with current and proposed digital audio standards, particularly those employing signal compression methods that can reduce the dynamic range of a signal. Dynamic range reduction processing of an audio signal may delete or damage an audio code inserted in the audio signal. In this regard, it is particularly important for an audio code to survive compression and subsequent de-compression carried out by, for example, the Dolby™ Digital Audio Code Number 3 (AC-3) Surround Sound algorithm or by one of the algorithms recommended in the Moving Picture Experts Group (MPEG) standards (e.g., MPEG-1, MPEG-2, MPEG-4, and the like).

Systems and methods for adding an inaudible code to an audio signal and subsequently retrieving that code in a manner that is compatible with current and proposed digital audio standards are known. In one such system, an encoder is arranged to add a binary code bit to a signal block by selecting, within the signal block, (i) a reference frequency within the predetermined signal bandwidth, (ii) a first code frequency having a first predetermined offset from the reference frequency, and (iii) a second code frequency having a second predetermined offset from the reference frequency. The spectral amplitude of the signal at the first code frequency is increased so as to render the spectral amplitude at the first code frequency a maximum in its neighborhood of frequencies and is decreased at the second code frequency so as to render the spectral amplitude at the second code frequency a minimum in its neighborhood of frequencies. A decoder can be arranged to decode the binary bit.

However, the extraction of audio codes from audio signals in such digital-audio-compatible systems requires considerable processing power, because complicated mathematical operations are used for code extraction. If several channels exist, it may be necessary to extract the audio codes from the numerous channels simultaneously. For example, DOLBY™ Digital AC-3 Surround Sound delivers six separate (discrete) channels of sound. AC-3 includes left, center, and right channels across the front of the room and separate (discrete) left and right surround sound channels. The sixth channel is a Low Frequency Effects Channel that is typically coupled to a sub-woofer or the like. With six separate channels, considerable processing power may be required to extract audio codes from each of the channels simultaneously.

DETAILED DESCRIPTION

Figure 1:
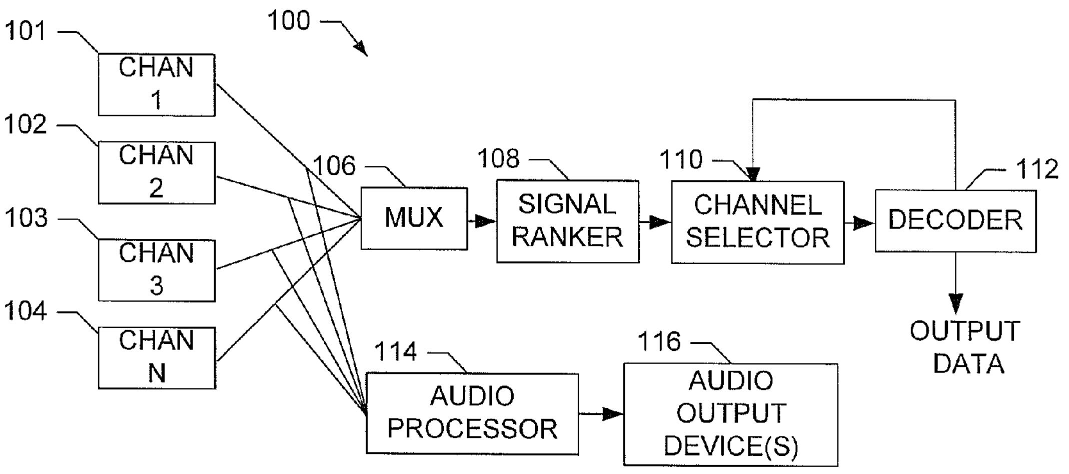
FIG. 1 is a block diagram of an example code extraction system.

In the example of FIG. 1, a code extraction system 100 receives signals from a plurality of channels 101-104. The channels may be audio channels, video channels or any other suitable channels through which signals or information may be exchanged. In general, the channels 101-104 can be any type of communications path between two or more devices that are each capable of carrying information, be it audio information, video information or any other information. The information passed through the channels 101-104 may be in digital or analog form. Although only four channels 101-104 are shown in FIG. 1, the number of channels coupled to the system 100 may be as few as one and as many as six or more. For example, if the channels are audio channels, a stereo audio system includes two audio channels and a Dolby™ surround system using AC-3 audio processing uses six audio channels (front left, right and center; rear left and right; and bass audio).

In practice, the channels 101-104 may be generated from a digital television bitstream. For example, a digital television bitstream may be de-multiplexed into its constituent audio, video and metadata components. The audio component, for example, may then be further de-multiplexed into a number of audio channels. The de-multiplexing operations may be carried out by a digital television, commercially-available television reception card that may be installed into a personal computer (PC), or custom receiver hardware. In the alternative, the channels 101-104 may be provided by hardware (e.g., a set top box) having a Sony/Philips Digital Interface (S/PDIF), which is an output through which digital audio data may be passed in a channelized format.

Some, none, or all of the channels 101-104 may contain information having identification codes embedded therein. The identification codes may be, for example, audio codes. The audio codes may be added to an audio signal using any method for encoding audio signals. For example, the broadcast encoding methods described in, for example, U.S. Pat. Nos. 5,450,490; 5,642,111; 5,764,763; and 6,272,176, the disclosures of each of which are hereby incorporated by reference in their entireties, can be used to insert or otherwise encode an audio code in an audio signal. However, any method for encoding a broadcast signal with an identification code can be used. By way of example, audio codes can be inserted into television audio content by program creators, broadcasters, final distributors, television networks, and the like. Although the codes could be any type of identification codes and do not have to be audio codes, the remainder of the description is directed, for ease of illustration, to the extraction of audio codes contained in audio channels. However, those having ordinary skill in the art will readily recognize that such a description is merely an example, and identification codes could be in any other channel and/or signal types than audio channels and signals. Accordingly, this disclosure should not be considered as limited to audio channels and/or audio codes, but as setting forth example code extraction systems, methods, and articles of manufacture.

The example system 100 includes a multiplexer 106, a signal ranker 108, a channel selector 110, a decoder 112, an audio processor 114, and audio output devices 116. It will be recognized by persons of ordinary skill in the art and will be apparent from the description below, that the term "multiplexer" as used herein is a generic term that describes any device that can perform multiplexing and/or de-multiplexing. The channels 101-104 are coupled both to the multiplexer 106 and the audio processor 114.

The multiplexer 106 can be any type of multiplexer that is capable of multiplexing and/or de-multiplexing signals, such as, for example, audio or video signals. The multiplexer 106 receives the channels 101-104 and de-multiplexes the information in the channels 101-104. The information from the multiplexer 106 passes to the signal ranker 108.

In general, the signal ranker 108 ranks the signals according to characteristic(s) of the signals in the channels 101-104. The signals may be ranked though a number of possible different techniques disclosed herein, such as by determining which channel or channels have the best signal quality.

The ranked signals pass to the channel selector 110, where a channel is selected for decoding based on the ranking performed by the signal ranker 108. For example, the channel selector 110 may select the channel ranked highest by the signal ranker 108.

Either signals selected by the channel selector 110 or codes extracted therefrom pass to the decoder 112, which decodes the codes and outputs the same. As the decoder 112 decodes the codes passes thereto, the decoder 112 produces a feedback signal that is coupled to the channel selector 110. The feedback signal may be used by the channel selector 110 as an interrupt that causes the channel selector 110 to execute one or more processes described below. For example, the decoder 112 may produce the feedback signal only when the decode quality of the codes being processed by the decoder 112 drops below a certain level. In such an instance, the channel selector 110 may respond by looking for a higher quality channel in which a code is found and coupling the code from that channel to the decoder 112 to improve the decode quality thereof.

Collectively, the multiplexer 106, the signal ranker 108, the channel selector 110 and the decoder 112 extract codes from a plurality of channels 101-104 in environments where multiple, potentially encoded, audio streams are present. In general, the disclosed systems, methods, and articles of manufacture are configured to extract information codes dynamically from one or more channels, rather than continuously decoding all of the channels simultaneously.

Although the multiplexer 106, the signal ranker 108, the channel selector 110 and the decoder 112 are shown in the example of FIG. 1 as being separate devices, those having ordinary skill in the art will readily appreciate that the signal ranker 108 and the channel selector 110 could be implemented as part of the multiplexer 106. Additionally, the multiplexer 106, the signal ranker 108, the channel selector 110 and the decoder 112 could be implemented by instructions on a single hardware unit, such as a PC or the like.

The audio processor 114 decodes the information in the channels 101-104 to produce audio that is coupled to the audio output devices 116, which may be speakers or the like. For example, if there are six channels of AC-3 audio that are coupled to the audio processor 114 for a program having surround sound audio, the audio processor 114 may decode the six channels of information into six audio signals that are coupled to the six audio output devices 116.

Although the example of FIG. 1 illustrates N channels being provided to the multiplexer 106, additional hardware and/or software may be provided between the channels 101-104 and the multiplexer 106 to reduce the number of channels from N to a number of channels fewer than N. For example, if a Dolby 5.1 signal having information for six channels is received by a three-channel receiver, certain ones of the six channels may be combined by the receiver to result in a total of three channels of information provided to the multiplexer 106. In such a case, the three channels of information may be processed to extract codes therefrom in the manner disclosed herein.

Figure 2:
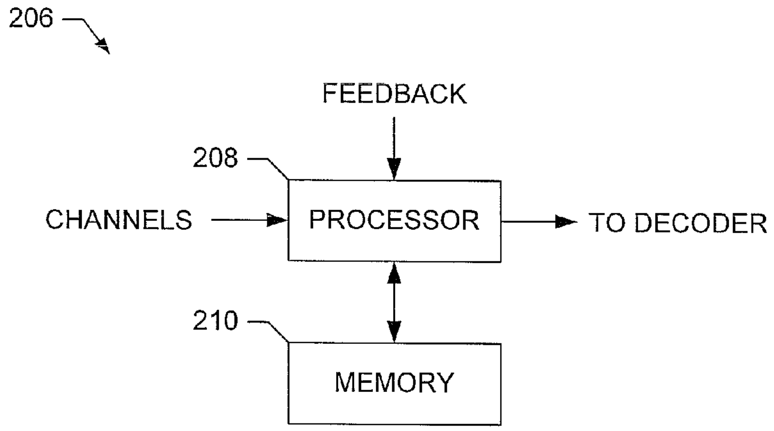
FIG. 2 is a block diagram of an example multiplexer of FIG. 1.

An example multiplexer 206 is shown in FIG. 2 as including the functionality of the signal ranker 108 and the channel selector 110. In the illustrated example the multiplexer 206 is implemented by a processor 208 and an associated memory 210. In the example of FIG. 2, the processor 208 receives the channels (e.g., some or all of the audio channels 101-104) and the feedback signal(s) from the decoder 112. The processor 208, which is programmed or configured to carry out tasks described below, processes the channels and extracts codes therefrom and passes the codes to the decoder 112. The processor 208 recognizes the feedback from the decoder 112 and may use the feedback as a cue to execute certain processes or portions of processes. The feedback from the decoder 112 may be an indication of low decode quality, high decode quality or any other suitable metric pertinent to decoding.

The processor 208 may be, for example, a microprocessor, a microcontroller, any type of PC, a digital signal processor (DSP) an application-specific integrated circuit (ASIC) or the like. Accordingly, the multiplexer 206 may be constructed completely in hardware or in hardware that executes instructions stored in software or firmware.

The memory 210 may be a programmable read-only memory (PROM), an erasable programmable read-only memory (EPROM), an electrically-erasable programmable read-only memory (EEPROM), flash memory or the like. Alternatively or additionally, the memory 210 may be any type of optical, magnetic, or electronic storage medium that is located either internally or externally to the multiplexer 206. For example, the memory 210 could be read-only memory (ROM), random access memory (RAM), compact disc read-only memory (CDROM), electro-optical memory, magneto-optical memory, or the like. The memory 210 may store, for example, instructions that dictate the operation of the processor 208. Additionally or alternatively, the memory 210 may be used to buffer the contents of one or more of the channels 101-104. For example, as described in detail below, the memory 210 could be used to buffer, for example, ten seconds of the contents of each of the channels 101-104.

Although shown as separate components in the example of FIG. 2, the processor 208 and the memory 210 could be integrated into a single component. For example, the processor 208 and the memory 210 could be integrated into a single microcontroller having on-board processing and memory components.

Figure 3:
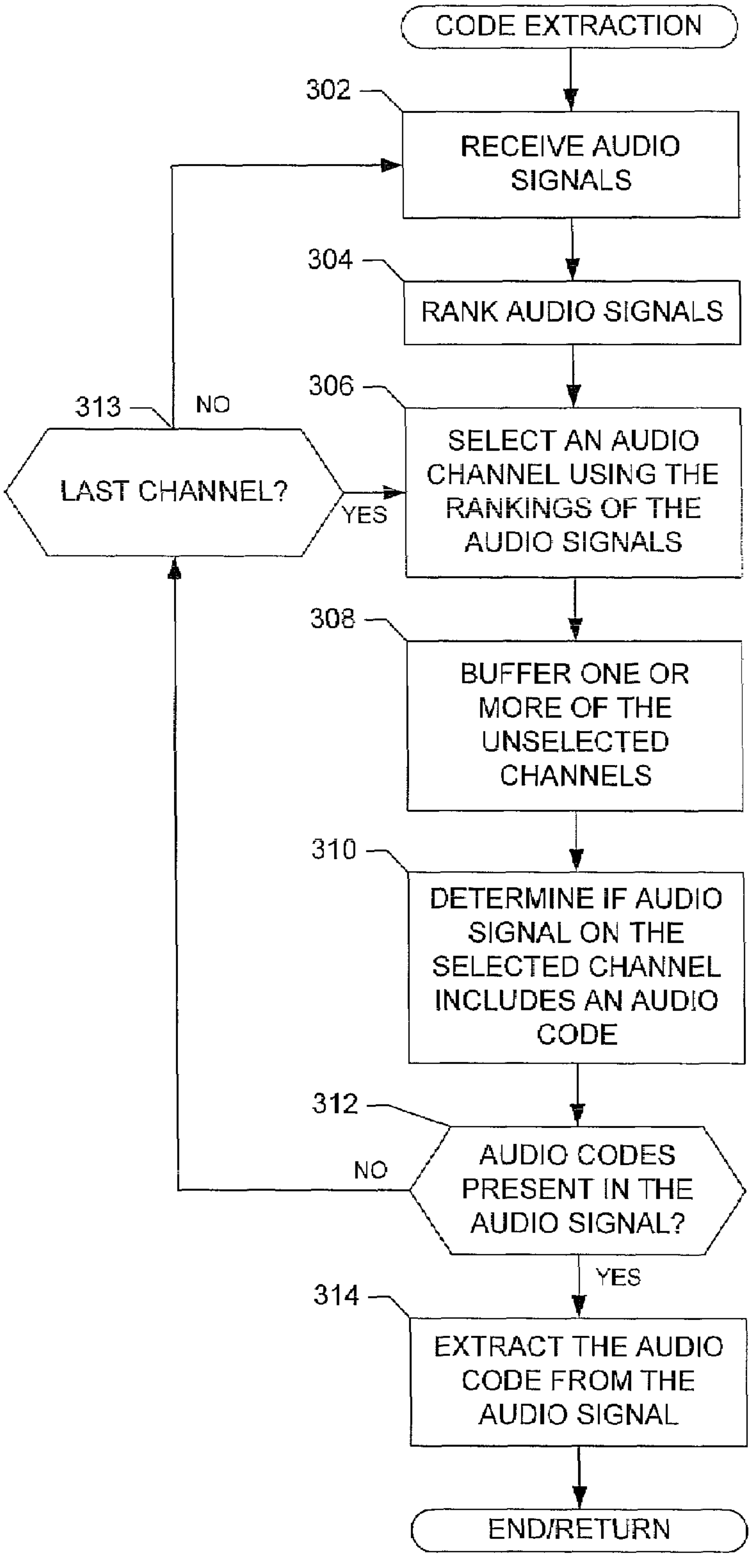
FIG. 3 is a flow chart of an example code extraction process.

An example process that may be carried out by the processor 208 of the multiplexer 106 is shown in FIG. 3. In this example, the multiplexer 206 receives audio signals from the channels (block 302). The audio signals may be, for example, any type of signal capable of carrying audio information and capable of being encoded with audio codes. For example, each audio signal can be 16-bit sampled mono data that is sampled at 24 kilohertz (kHz) or 48 kHz. Any number of audio signals can be received on any number of audio channels. In an example, separate audio signals can be received on each audio channel.

The received signals are then ranked according to characteristics that are correlated with audio code fidelity (block 304). The audio signals received from the channels 101-104 may be ranked, ordered, or otherwise graded based on one or any combination of characteristics or features of the audio signals. Characteristics according to which the audio signals may be graded may include signal amplitude, signal energy, signal strength, signal to noise ratio (SNR), a history of a percentage of time that the amplitude or energy of the signals exceeds a threshold and the number of times an audio signal has been successfully decoded to yield an audio code. Alternatively, the characteristic used to rank signals may include certain aspects of the frequency spectrum of the audio signals.

If audio signal amplitude and/or strength of the signals are used to characterize the signal(s), any technique for determining the amplitude and/or signal strength of a signal can be used. Various techniques for determining signal energy are disclosed, for example, in U.S. Pat. No. 5,170,437, the entire disclosure of which is hereby incorporated by reference in its entirety. Of course, other techniques for determining signal energy may alternatively be used.

To rank, order or otherwise grade the signals, the characteristics or features, or any combination thereof, are measured or otherwise determined for each received audio signal. For example, the amplitude of each received audio signal can be determined. Once determined, the characteristic(s) or feature (s) can be used to rank or order the audio signals. To perform the ranking, for example, each audio signal can be assigned a value, percentage or any other numerical designation that is equivalent to or representative of the measured value of the characteristic(s) or feature(s). For example, if audio signal amplitude is calculated for each signal, the audio signals can be ranked in order of, for example, largest audio signal amplitude to smallest audio signal amplitude. The audio signals can be ranked in any increasing or decreasing order of the characteristic(s) or feature(s) measured, so long as the audio signal with the largest occurrence of the given characteristic(s) or feature(s) can be determined relative to the next largest occurrence of the given characteristic(s) or feature(s), relative to the third largest occurrence, etc.

The characteristics by which the ranking of audio signals is performed (block 304) may be determined by the multiplexer 206 or could be determined by any other component. In an example system in which the characteristic(s) are passed to the multiplexer 206 by another device, the multiplexer 206 would then rank the audio signal based on the characteristics passed thereto.

After the audio signals have been ranked (block 304), the multiplexer 206 selects an audio channel to be processed based on the rankings (block 306). The selected audio channel may be the audio channel having the signal(s) with the highest signal strength, the highest audio level or, more generally, the audio channel having an audio signal with the best ranking, regardless of the characteristic by which the audio signal are ranked. As used herein, to "select" an audio channel is to create a communication path or connection between the desired channel and a device. Additionally or alternatively, selection may mean that a particular audio channel or audio signal will be further processed by the multiplexer 206.

Once an audio channel has been selected (block 306), the multiplexer 206 may, optionally, buffer one or more of the unselected channels in the memory 210 (block 308). For example, the multiplexer 206 may buffer ten seconds of audio signals from the audio channels corresponding to the audio signals having the second and third highest rankings (provided that the audio channel corresponding to the highest ranked signal was selected).

Buffering audio signals from one or more unselected channels is advantageous in that, if the selected signal is of poor quality or does not include a detectable audio code, one of the buffered signals may be used as a backup. For example, if the multiplexer 206 searches for audio codes in the highest ranked channel for ten seconds and is unable to find audio codes therein, the multiplexer 206 may, in effect, travel back in time and analyze buffered 10 seconds of another audio channel to determine if the buffered channel included an audio code. Buffering may be particularly advantageous in situations in which audio channels are being scanned for an audio code corresponding to a 15 second television commercial. If the multiplexer 206 and the decoder 112 cannot find an audio code in a selected audio channel for 10 seconds, there is jeopardy that the multiplexer 206 and the decoder 112 will miss the occurrence of the commercial. However, if ten seconds of other audio channels are buffered, the multiplexer 206 and the decoder 112 may evaluate the buffered channels for the occurrence of an audio code corresponding to the commercial. While advantageous in certain aspects, like the other block of the example process of FIG. 3, the buffering (block 308) need not be carried out and can be eliminated.

After buffering of the unselected channels (block 308) or, if buffering is not performed, after the selection of an audio channel (block 306), it is determined if the audio signal on the selected audio channel includes an audio code (block 310). Any method for determining or otherwise detecting the existence of an audio code in an audio signal can be used to determine whether at least one audio code is present. For example, the audio signal on the selected audio channel may be fully or partially decoded to determine if an audio code is present. Example techniques for decoding (either fully or partially) the audio signal are disclosed in, for example, U.S. Pat. Nos. 5,450,490, 5,642,111, 5,764,763, and 6,272,176, which are incorporated herein by reference.

The multiplexer 206 may itself determine if the signals on the selected audio channel include audio codes. In the alternative, the multiplexer 206 may pass the audio signal from the selected channel to another device (e.g., a decoder) that is capable of decoding or otherwise extracting audio codes from audio signals using such decoding methods. If performed by another device, the results of the detection or decoding process can be sent or fed back to the multiplexer 206. The information received by the multiplexer 206 can be used by the multiplexer to determine whether the audio signal on the selected channel includes an audio code. For example, if a decoded audio code is fed back to the multiplexer 206 from, for example, an audio code decoder (e.g., the decoder 112), the multiplexer 206 can determine if the audio signal includes an audio code.

A finite period of time will be allotted for determining if the selected audio channel includes an audio code. Any time interval that is predetermined or determined on the fly can be used, depending on the desired response of the system. If no audio codes are decoded from the selected audio channel (either by the multiplexer 206 or from feedback from the audio code decoder 112) within the time interval, the multiplexer 206 may determine that no audio codes are present in the audio signal. Accordingly, the time period sets the maximum time limit by which an audio code must be found. If an audio code is not found within the allotted time period, the multiplexer 206 will conclude that audio codes are not present on the selected audio channel. Audio codes may not be present in an audio signal for numerous reasons. For example, for television audio content, if the audio content is silent (i.e., there is no audio signal for certain intervals of time) or the audio content is not encoded with an audio code, an audio code will not be present.

If audio codes are not found within the selected channel (block 312) and there are more channels remaining in the ranking that have not been used (block 313), control returns to block 306, where another audio channel is selected. When another audio channel is selected (block 306), such a selection may include selecting one or more channels stored in the buffer or memory 210. The selection (block 306) may be based on the ranking that was previously calculated (block 304). For example, the audio channel having the second highest rank may be selected. If the channel having the second highest rank does not include an audio code (block 310), the third-ranked audio channel may be selected, and so on until an audio code is found in the audio signal of a selected audio channel. In other words, control continues to loop through blocks 306-312 until audio codes are detected and/or every channel has been checked without discovery of an audio code. In no audio codes are detected in any channel, control returns to block 302. If there are no more channels remaining the ranking that have not been used (block 313), control returns to block 302.

Conversely, if it is determined that the audio signal does include an audio code (block 312), the multiplexer 206 extracts the audio code(s) from the audio signal (block 314). Any method for extracting or otherwise decoding audio code (s) from an audio signal can be used, such as that described in, for example, U.S. Pat. Nos. 5,450,490, 5,642,111, 5,764,763, and 6,272,176, which have been incorporated by reference herein. However, any method for decoding an identification code from a broadcast signal can be used. The audio code extraction can be performed by, for example, the multiplexer 206 or the decoder 112.

Once decoded, the extracted audio code(s) can be used by the multiplexer 206, the decoder 112, or passed along to any other device or process for subsequent processing. For example, the extracted audio code(s) can be optionally used to identify the content of the audio signals, e.g., the program content of a television program. For example, the extracted audio code(s) can be optionally used to identify a distributor (e.g., the final distributor) of the audio signals.

Figure 4:
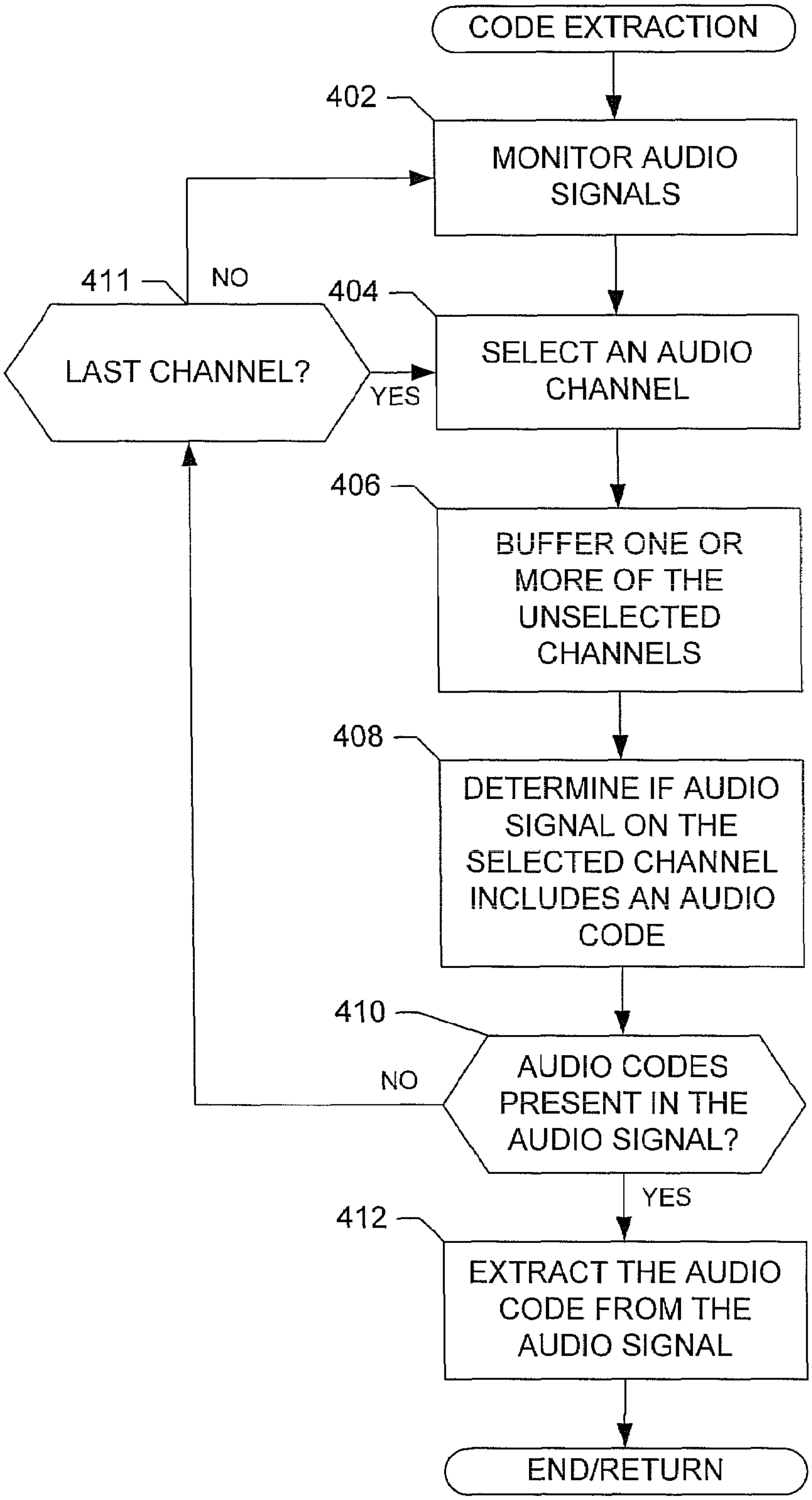
FIG. 4 is a flow chart of a second example code extraction process.

As an alternative to the process of FIG. 3, the multiplexer 206 and, more particularly, the processor 208 of the multiplexer 206, may implement the example process shown in FIG. 4. The process of FIG. 4 is similar to the process of FIG. 3 in as much as both processes select a channel based on signal characteristics and determine if any signal on the selected channel includes codes. If any signal includes a code, the multiplexer 206 extracts the code(s) and passes the extracted code(s) to the decoder 112 for processing. In the alternative, the code extraction may be carried out by the decoder 112. As explained below, the processes of FIG. 3 and FIG. 4 differ in how the audio channels are selected for processing.

The example process of FIG. 4 begins by monitoring signals on the channels (block 402). For example, separate audio signals can be monitored on each channel. As will be readily appreciated by those having ordinary skill in the art, any number of audio signals on any number of audio channels can be monitored. The monitoring may include monitoring the amplitude of the audio on a channel, monitoring the energy of an audio signal, monitoring the SNR (signal-to-noise ratio) of a particular channel, etc.

After or while the audio signals are monitored (block 402), an audio channel is selected based on at least one characteristic of the audio signals that are monitored (block 404). While the example process of FIG. 3 ranked audio signals, the example process of FIG. 4 need not rank or order the audio signals. Rather, the example process of FIG. 4 may merely select an audio channel having acceptable monitored characteristics and need not necessarily select the audio signal or channel having the best ranking.

After an audio channel is selected (block 404), signals on one or more of the unselected channels may be buffered (block 406). As described in conjunction with the example process of FIG. 3, buffering is advantageous, but not necessary. If, however, buffering is performed (block 406) the multiplexer 206 may, as described below, later use the buffered information to effectively go back in time to determine any codes that may have been missed while the multiplexer 206 was monitoring a channel including information that did not include a code(s) or included a code(s) of poor quality that could not be decoded.

After the audio channel has been selected (block 404) and any optional buffering is performed (block 406), it is determined if the audio signal on the selected audio channel includes one or more audio codes (block 408). If audio codes are not present (block 410) and there are more channels in the ranking that have not been used (block 411), a different audio channel is selected (block 404). The selection (block 404) may include selecting signals that are previously buffered (block 406). The operation of the blocks 404-410 will continue to iterate until audio code(s) of acceptable quality are detected in the selected audio signal (block 410). Alternatively, if it is determined that there are no more unused channels in the ranking (block 411), control returns to the block 402. When it is determined that audio code(s) of acceptable quality are present in the audio signal (block 410), the audio code(s) are extracted from the audio signal (block 412). The details of blocks 408-412 may be similar or identical to the details provided in conjunction with blocks 310-314 of FIG. 3.

Figure 5:
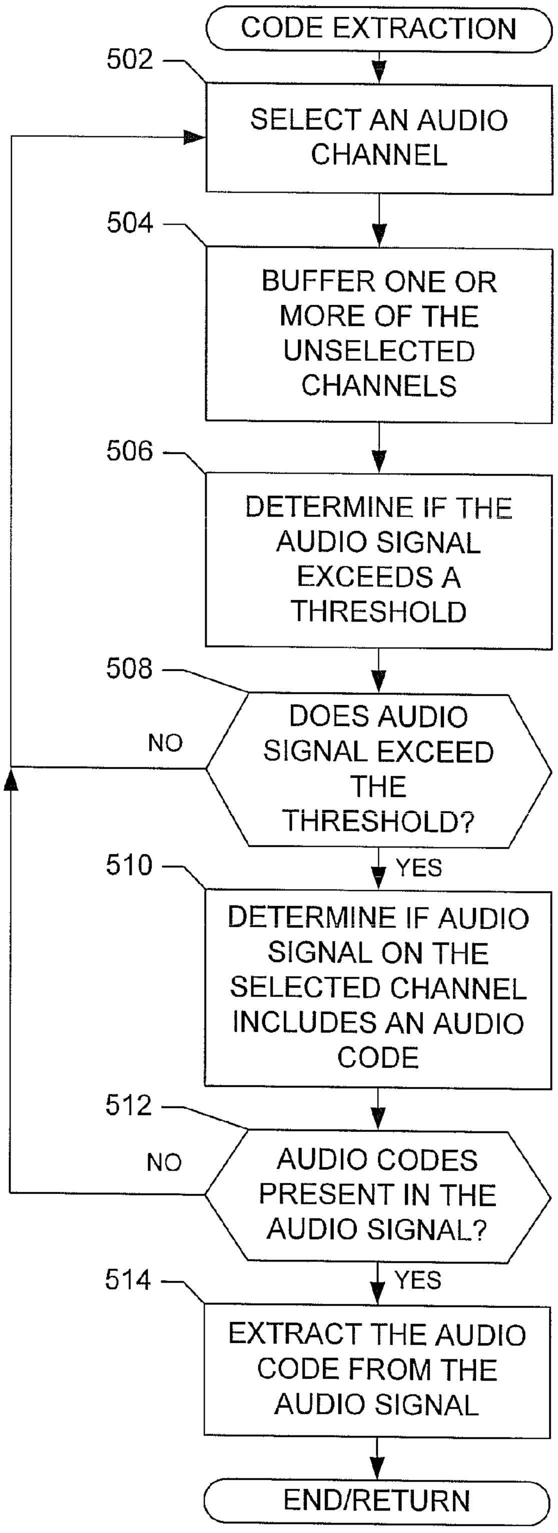
FIG. 5 is a flow chart of a third example code extraction process.

A further example process for selecting audio channels is shown in FIG. 5. The example process of FIG. 5 begins when an audio channel is selected (block 502). The selection of an audio channel may be a random selection or may be an ordered selection that may include a ranking of the audio channels according to one or more particular criteria or characteristic(s) of signals on the audio channels. Following the selection of an audio channel (block 502), one or more of the unselected channels are optionally buffered (block 504).

As noted with respect to the example processes of FIGS. 3 and 4, the buffering of unselected audio channels enables the multiplexer 206 to access information on unselected audio channels, wherein such information was presented on the unselected audio channels at the same time the selected audio channel was processed. Accordingly, buffering of unselected audio channels, which is optional to the process of FIG. 5, enables the multiplexer 206 to recover codes that could have been missed without the use of the buffering.

After channel selection (block 502) and optional buffering (block 504) an audio signal that is received on the selected channel is compared to a threshold (block 506). For example, any one or more of the energy, amplitude, the SNR or any other relevant characteristics of the selected signal of the selected signal is compared to corresponding thresholds for those characteristics. For example, the SNR and the energy of the selected signal may be respectively compared to SNR and energy thresholds to determine if the characteristics exceed the threshold (block 506).

If the characteristic(s) of the audio signal do exceed the threshold(s) (block 508), it is determined if the audio signal on the selected channel includes audio codes (block 510). If audio codes are present in the selected signal (block 512), audio codes are extracted from the audio signal (block 514). The blocks 510-514 may be implemented in a manner similar or identical to the corresponding blocks in FIGS. 3 and 4.

If the characteristic(s) of the audio signal do not exceed the threshold(s) (block 508) or audio code(s) are not present in the signal (block 512), control returns to block 502, at which point another audio channel is selected. The second selected audio channel could be an audio channel that has been previously buffered (block 504) or could be an audio channel that is presently being received. The second selected audio channel is compared to a threshold (block 506) and, if the threshold is exceeded (block 508), it is determined if the audio channel includes a signal having audio codes therein (block 510). Control loops through blocks 502-512 until a channel is found that includes a signal having a characteristic that exceeds the threshold and includes one or more audio code(s), at which point the audio code(s) are extracted (block 514).

The example processes of FIGS. 3-5 could be started at particular time intervals or could be started in response to a stimulus. For example, upon power-up of the multiplexer 206, the example processes of FIGS. 3-5 could be performed and an audio channel having audio codes therein could be selected and the audio codes could be extracted therefrom and passed to the decoder 112. The example processes of FIGS. 3-5 would not necessarily need to be executed again until the decoder 112 provides feedback to the multiplexer 206 to indicate that the audio codes being decoded by the decoder 112 are of poor quality. Upon receiving such an indication from the decoder 112, the multiplexer 206 would start one of the example processes of FIG. 3-5 again so that another channel could be selected and the audio codes could be extracted therefrom.

Although certain example apparatus, methods and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method to extract audio codes comprising:

receiving audio frequency signals on a plurality of audio channels;

ranking the audio frequency signals based on at least one characteristic of the audio frequency signals;

selecting a first audio channel from the plurality of audio channels based upon the ranking of the audio frequency signals;

determining whether a first audio frequency signal on the first audio channel includes at least one audio code; and extracting the at least one audio code from the first audio frequency signal when the first audio frequency signal includes the at least one audio code.

2. A method as defined by claim 1, further comprising buffering a second audio frequency signal from a second audio channel while determining whether the first audio frequency signal on the first audio channel includes the at least one audio code.

3. A method as defined by claim 2, wherein buffering the second audio frequency signal comprises buffering a predetermined time interval of the second audio frequency signal.

4. A method as defined by claim 3, further comprising extracting the at least one audio code from the buffered predetermined time interval of the second audio frequency signal, when the second audio frequency signal includes the at least one audio code.

5. A method as defined by claim 1, wherein the ranking dependent on one or more of signal to noise ratio of the audio frequency signals, the amplitude of the audio frequency signals, or a number of times the audio frequency signal has been successfully decoded to yield an audio code.

6. A method as defined by claim 1, further comprising identifying a content of the audio frequency signals based on the extracted at least one audio code.

7. A method as defined by claim 1, further comprising:

receiving a digital programming bitstream;

de-multiplexing an audio component from the digital programming bitstream; and de-multiplexing the audio component into the plurality of audio frequency signals on the plurality of audio channels.

8. A system to extract audio codes comprising:

a multiplexer to receive audio frequency signals on a plurality of audio channels;

a ranker to rank the audio frequency signals based on at least one characteristic of the audio frequency signals;

a channel selector to select a first audio channel from the plurality of audio channels based upon the ranking of the audio frequency signals; and a decoder to determine whether a first audio frequency signal on the first audio channel includes at least one audio code and to extract the at least one audio code from the first audio frequency signal when the first audio frequency signal includes the at least one audio code.

9. A system as defined by claim 8, wherein the multiplexer is configured to buffer a second audio frequency signal from a second audio channel while the decoder determines whether the first audio frequency signal on the first audio channel includes the at least one audio code.

10. A system as defined by claim 8, wherein the ranker ranks the audio frequency signals based on one or more of signal to noise ratio of the audio frequency signals, the amplitude of the audio frequency signals, or a number of times the audio frequency signal has been successfully decoded to yield an audio code.

11. A system as defined by claim 8, further comprising:

a de-multiplexer to receive a digital programming bitstream and to de-multiplex an audio component from the digital programming bitstream, wherein the de-multiplexer further de-multiplexes the audio component into the plurality of audio frequency signals on the plurality of audio channels.

12. An article comprising a machine-accessible medium having a plurality of machine accessible instructions that, when executed, cause a machine to:

receive audio frequency signals on a plurality of audio channels;

rank the audio frequency signals based on at least one characteristic of the audio frequency signals;

select a first audio channel from the plurality of audio channels based upon the ranking of the audio frequency signals; and determine whether a first audio frequency signal on the first audio channel includes at least one audio code; and extract the at least one audio code from the first audio frequency signal when the first audio frequency signal includes the at least one audio code.

13. An article as defined by claim 12, further comprising machine accessible instructions that, when executed, cause the machine to buffer a second audio frequency signal from a second audio channel while the decoder determines whether the first audio frequency signal on the first audio channel includes the at least one audio code.

14. An article as defined by claim 12, further comprising machine accessible instructions that, when executed, cause the machine to rank the audio frequency signals based on one or more of signal to noise ratio of the audio frequency signals, the amplitude of the audio frequency signals, or a number of times the audio frequency signal has been successfully decoded to yield an audio code.

15. An article as defined by claim 12, further comprising machine accessible instructions that, when executed, cause the machine to:

receive a digital programming bitstream;

de-multiplex an audio component from the digital programming bitstream; and de-multiplex the audio component into the plurality of audio frequency signals on the plurality of audio channels.

16. A method to extract an audio code, comprising:

selecting a first audio channel from a plurality of audio channels;

receiving a first audio frequency signal on the first audio channel;

determining whether the first audio frequency signal exceeds a predetermined threshold of at least one characteristic of audio frequency signals on the plurality of audio channels; and if the first audio frequency signal exceeds the predetermined threshold of the at least one characteristic of the audio frequency signals:

(a) determining whether the first audio frequency signal includes at least one audio code; and (b) extracting the at least one audio code from the first audio frequency signal.

17. A method as defined by claim 16, further comprising buffering a second audio frequency signal from a second audio channel while receiving the first audio frequency signal on the first audio channel.

18. A method as defined by claim 17, further comprising:

selecting the second audio channel from the plurality of audio channels, when the first audio frequency signal is less than the predetermined threshold of the at least one characteristic of the audio frequency signals and the at least one audio code is absent from the first audio frequency signal;

receiving the second audio frequency signal on the second audio channel;

determining whether the second audio frequency signal exceeds the predetermined threshold of at least one characteristic of the audio frequency signals; and determining whether the second audio frequency signal includes the at least one audio code.

19. A system to extract audio codes, comprising:

a multiplexer to select a first audio channel from a plurality of audio channels and to receive a first audio frequency signal on the first audio channel, the multiplexer further configured to determine whether the first audio frequency signal exceeds a predetermined threshold of at least one characteristic of audio frequency signals on the plurality of audio channels; and a decoder to determine whether the first audio frequency signal includes at least one audio code and to extract the at least one audio code from the first audio frequency signal.

20. A system as defined by claim 19, wherein the multiplexer buffers a second audio frequency signal from a second audio channel while receiving the first audio frequency signal on the first audio channel.

21. An article comprising a machine-accessible medium having a plurality of machine accessible instructions that, when executed, cause a machine to:

select a first audio channel from a plurality of audio channels;

receive a first audio frequency signal on the first audio channel;

determine whether the first audio frequency signal exceeds a predetermined threshold of at least one characteristic of audio frequency signals on the plurality of audio channels;

determine whether the first audio frequency signal includes at least one audio code; and extract the at least one audio code from the first audio frequency signal.

22. An article as defined by claim 21, further comprising machine accessible instructions that, when executed, cause the machine to buffer a second audio frequency signal from a second audio channel while receiving the first audio frequency signal on the first audio channel.

* * * * *